Figure 4:
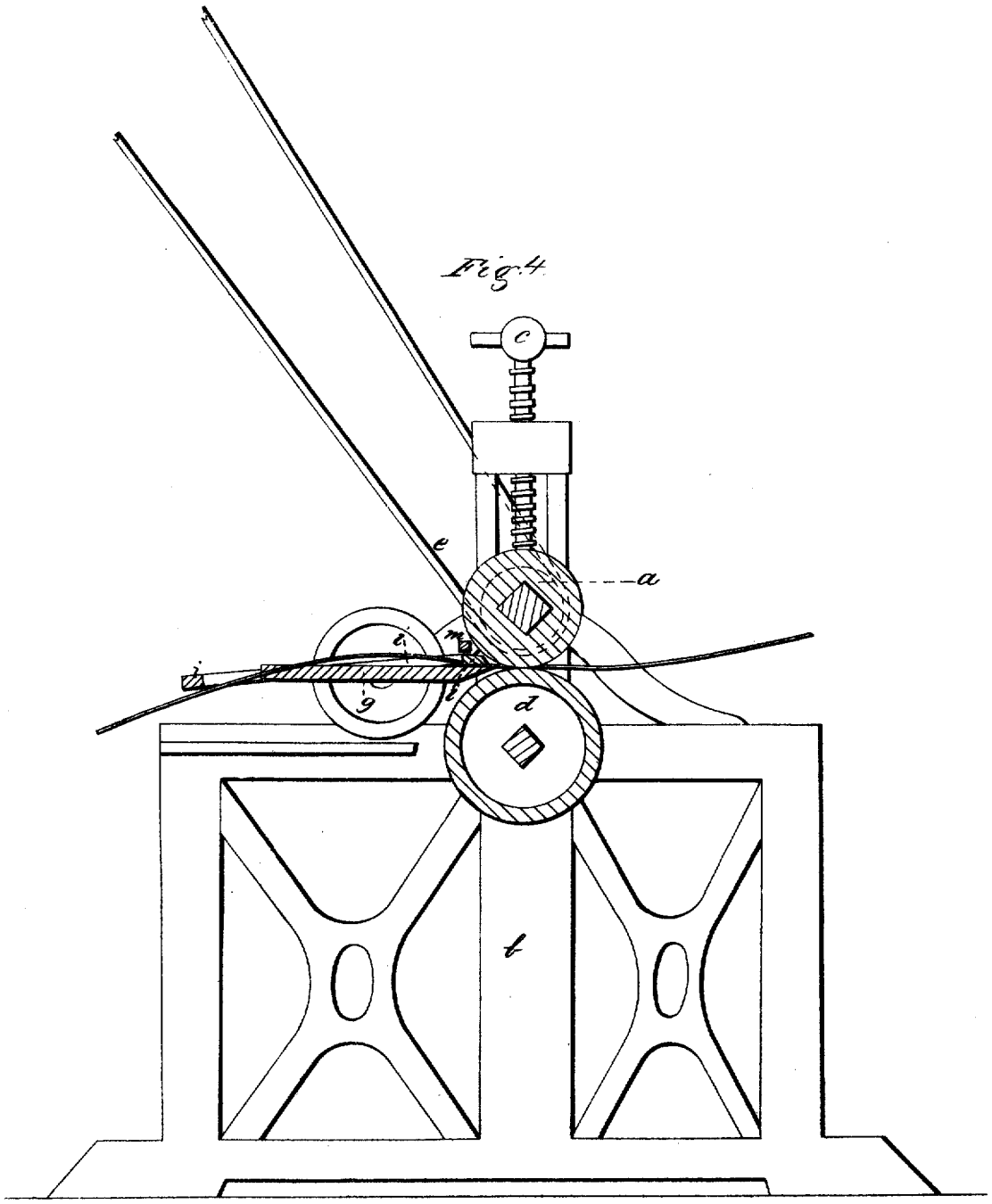
Figure 2:
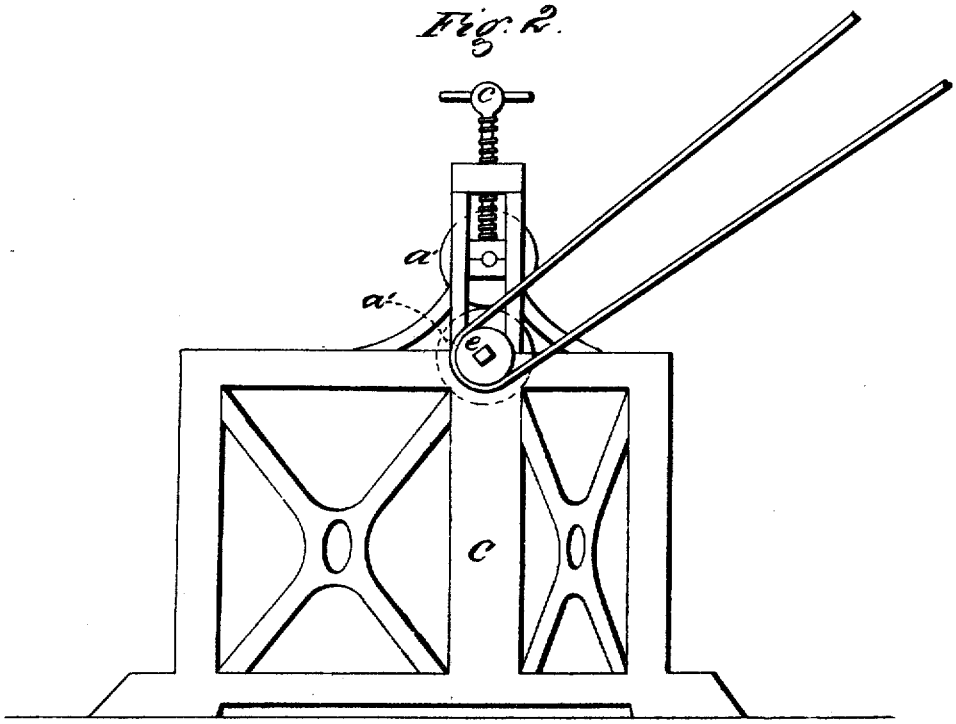
Figure 3:
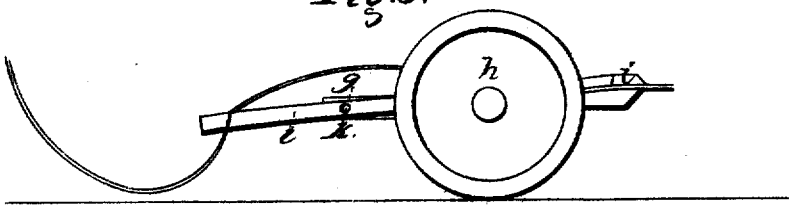
Figure 1:
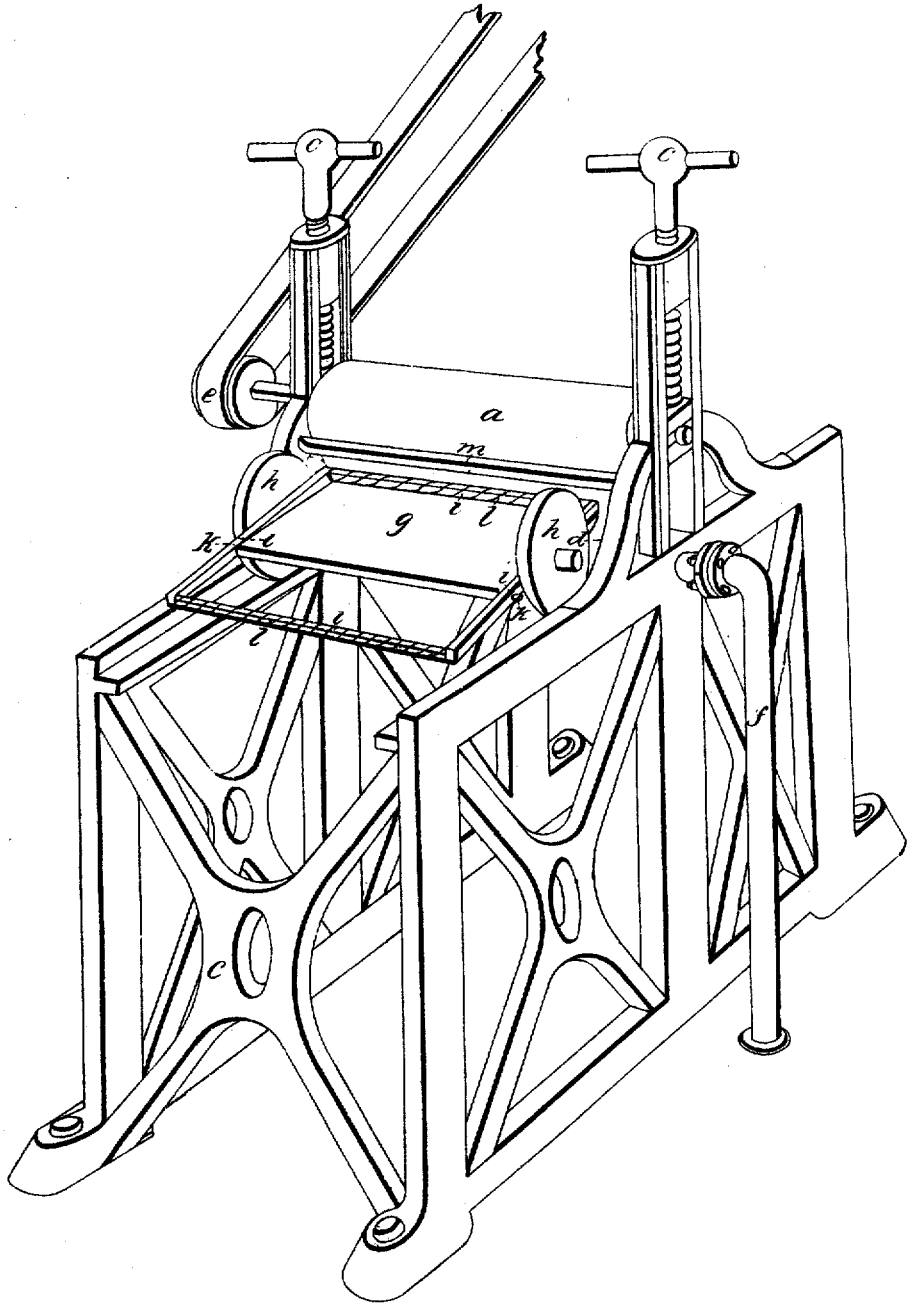

6048X

T. Gilpin Sheet 3, 3 Sheets.

Paper Polishing Mach.

No. Patented Jun. 25, 1830.

6048X

T. Gilpin. Sheet 2, 3 Sheets.

Paper Polishing Mach.

No. Patented Jun. 25, 1830.

6048X

T. Gilpin. Sheet 1, 3 Sheets.

Paper Polishing Mach.

No. 9 Patented Jun. 25, 1830.

Thomas Gilpin
Letters Patent

X 6048

The schedule referred to in these Letters Patent and making part of the same containing a description in the words of the said Thomas Gilpin himself of his improvement in machinery for finishing paper.

In compleance with the provisions of the Patent law I do describe my process invention and discovery, of the art of improving and finishing paper by a rolling process of machinery to be in manner as follows to wit. I construct a roller to be made of paper compressed upon an iron shaft and then turned on the surface perfectly smooth and true in the same manner as those are made which are used for the callendering of cloth and cotton goods in the usual manner as well known, and I suspend the same in a frame usually made of iron with adjusting screws over the journals to press down the same and regulate the pressure as required. and I also provide an iron cylinder perfectly smooth on the outside but so large as to afford room to be hollow in the inside for the admission of heat convenientty, say from four to eight inches diameter and this said hollow iron cylinder is to be suspended in the same frame as the aforesaid paper roller and may be put immediately below the same, so that by the pressure of the screws the paper roller may be let down upon the same. and then when a power is applied upon a pulley in the well known usual manner either from a revolving shaft or cog wheel to the said hollow cylinder. or paper roller. as convenience may dictate the two rollers are to be brought into contact and will revolve together. Heat may then be introduced into the iron roller by iron or other heaters or by steam. the paper may then be passed between the two rollers and be pressed. and to obtain the [illegible] by the said process constitute my said art or invention. The degree of [illegible]

X6048 sure as well as the skill of managing the same is to be left to
the further experience of the workman. I have also investiga-
ted another machine to effect the same purpose of rolling
paper. by using two paper rollers in a similar frame to the
above, to move together in contact with each other. so as to
admit the paper to pass between them. and in this process I
either use the two paper rollers together, or I use them with
an iron roller between them. as may be most eligible —
but the process I consider as analogous to the preceding.
I have found it necessary also to add a useful instrument
to the above invention for the purpose of securing the paper,
as it is passed between the said rollers from injury by crea-
sing or running unevenly. which instrument I call a
conductor. It may be made in a variety of forms and
such an instrument cannot well be done without in this
application and process. The form I have used it in is by
having a flat board suspended horizontally upon axles
with two wheels on each side upon which the paper may be
laid. I have then an open frame made to surround the said
board, & suspend the same on the two sides on pivots. the end
or side of the open frame next to the rollers rests upon the said
board and the other end or side comes underneath the
said board so that it may be pressed up to it by the hand.
the end next the rollers will then come down upon the
board and the sheet of paper when laid upon the board is to
be shoved or pushed forward upon it but under the end of
the open frame which is above the board and by which
it may be pressed and gripped as by a pair of tongs and kept
smooth as it is drawn forward from the conductor into the
rollers, — this end of the open frame had better be wrapped
around with a woolen cloth — the effect of squeezing or pres-
sing the paper evenly throughout the whole sheet. so that it
may be delivered in an even manner into the rollers by any

[illegible]

X6048 process is part of my discovery, as it has never been done in any manner; — and I describe the above as one way I have adopted to effect it: it may be done also by pressing a straight edge or cushion up to one of the rollers and passing the sheet of paper between the straight edge or cushion, so as to gripe the paper against the roller in order to pass it evenly into the action at the contact of the rollers. Another part of my invention consists in fixing a permanent iron bar or rod opposite to the contact or conjunction of the two rollers so that accidents may be prevented by things going into them or persons being caught and hurt by them. The said bar to be connected to the standard or sides of the iron frame in which the rollers are suspended Witnesses John B. Wilson B. B. Blackiston Thomas Gilpin 1000 words.